March 9, 1965 S. A. COGSDILL 3,172,309
DEBURRING TOOL
Filed April 28, 1961
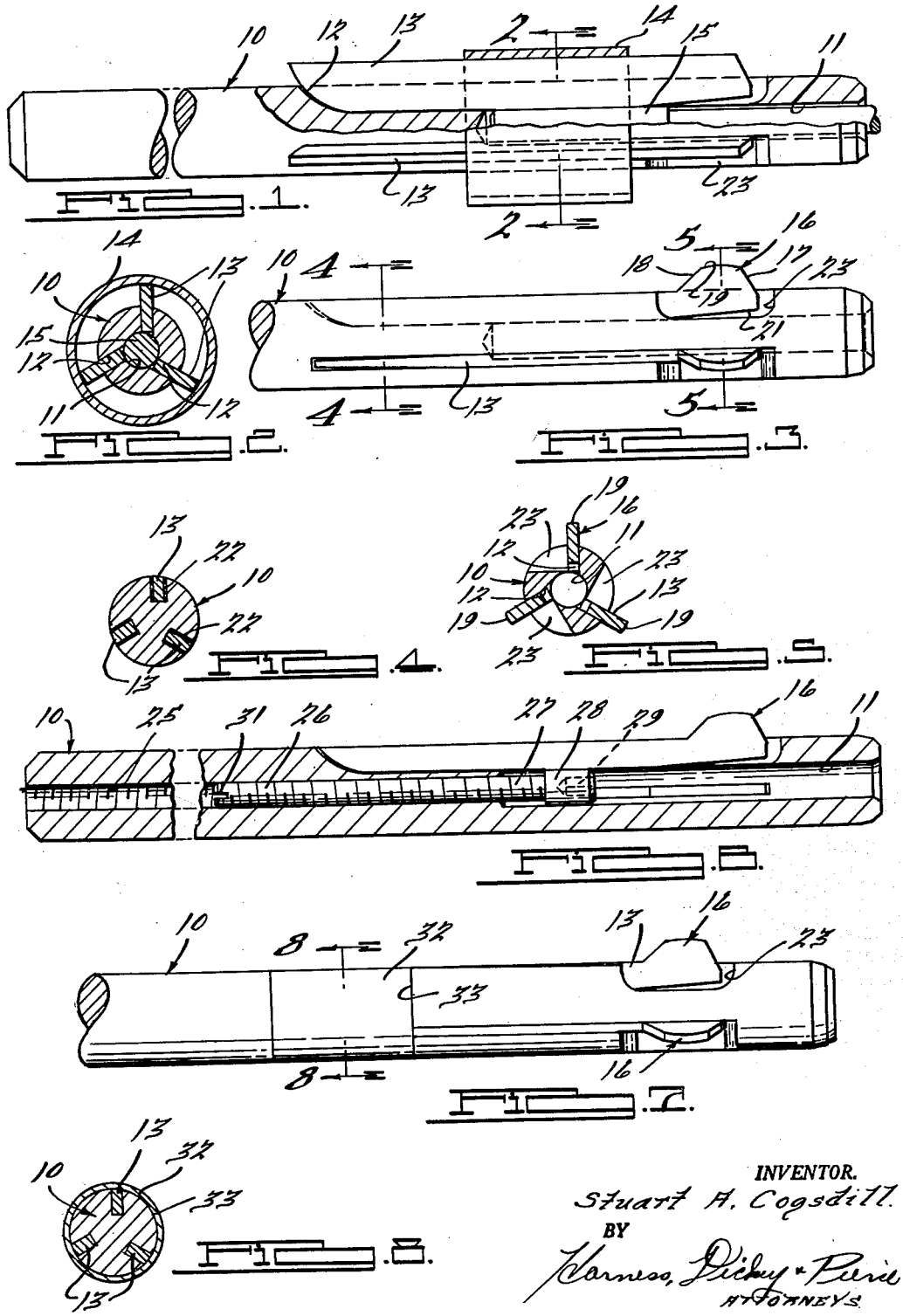
INVENTOR.
Stuart A. Cogsdill
BY
Harness, Dickey & Pierce
ATTORNEYS United States Patent Office 3,172,309
Patented Mar. 9, 1965

3,172,309
DEBURRING TOOL
Stuart A. Cogsdill, Orchard Lake, Mich., assignor to Cogsdill Tool Products, Inc., Oak Park, Mich., a corporation of Michigan
Filed Apr. 28, 1961, Ser. No. 106,289
11 Claims. (Cl. 77—73.5)

This invention relates to deburring tools, and particularly to a deburring tool having one or more fixed blades therein.

The tool of the present invention comprises a body having a driven and a cutting end, with an aperture extending inwardly from the end containing the cutting blades. A plurality of longitudinally extending slots in the body have strips of steel secured therein at the solid part of the body beyond the central aperture in which the forward end of the blades may deflect. A plug is inserted within the body and a ring placed over the outer edges of the blades to hold them in position when being heated to have the rear end of the blades brazed to the body. The plug is then removed along with the ring and the extending portions of the blades are machined to be in the spherical surface of the body with the exception of the heads at the cutting end of the blades. The forward end of the cutting head is sharpened to cut the burr from the forward side of the workpiece and is sloped rearwardly so as to deflect the head inwardly into the central aperture when the body is advanced in the aperture. The heads pass through the aperture and when moved outwardly by the resiliency of the blades, the rear cutting edges thereon cut the burr from the inside edge of the workpiece. A thread may be provided in the inner part of the body in extension of the aperture for receiving a threaded screw, the head of which is adjustable along with the aperture to change the bending moment of the blades and the strength thereof. Instead of brazing the blades in position within the slots in the body, a band may be provided for holding the rear ends of the blades within the slot. The body may be shrunk by cooling and the band may be expanded by heating and assembled on the body within an annular recess for securing the blades in the slots. The band may be machined to have the same diameter as the body.

Accordingly, the main objects of the invention are: to provide a deburring tool with a plurality of resilient blades which have cutting ends which are deflectable, with a suppporting body to which the opposite ends are rigidly secured; to form a deburring tool from a round body having a central aperture in the forward ends of a plurality of blades in which slots in the body may deflect when the opposite ends are rigidly secured to the slots; to provide a deburring tool having a hollow body portion into which cutting blades are deflectable, with a head which is adjustable within the body to change the bending moment of the blades, and, in general, to provide a deburring tool which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIG. 1 is a broken view, with parts in section, of a deburring tool embodying features of the present invention;

FIG. 2 is a sectional view of the structure illustrated in FIG. 1, taken on the line 2—2 thereof;

FIG. 3 is a broken view in elevation of the tool illustrated in FIG. 1 after being completed;

FIG. 4 is a sectional view of the structure illustrated in FIG. 3, taken on the line 4—4 thereof;

FIG. 5 is a sectional view of the structure illustrated in FIG. 3, taken on the line 5—5 thereof;

FIG. 6 is a sectional view of a tool, similar to that illustrated in FIG. 1, showing a further form thereof;

FIG. 7 is a view in elevation of a tool, similar to that of FIG. 3, showing another form thereof, and FIG. 8 is a sectional view of the structure illustrated in FIG. 7, taken on the line 8—8 thereof.

The tool illustrated in FIGS. 1 to 5 has a body 10 made of machinable steel and of cylindrical form. An aperture 11 extends inwardly from the cutting end of the body, communicating with a plurality of slots 12 extending inwardly from the outer surface of the body along the longitudinal length thereof. Blades 13 are disposed within the slots 12 and retained in fixed position therein by a band 14 which holds the blades against the bottom of the slot at the rear end thereof and against a removable plug 15 in the aperture opposite to the band 14. The rear ends of the blades are brazed or otherwise secured within the slot in the portion thereof in rear of the aperture 11 with which the forward portion of the slot communicates. The band 14 is removed and the extending portion of the blades is machined to the surface of the body except for the head 16 at the cutting end. The head has the forward edge 17 sloping upwardly and to the rear, and the rear edge 18 slopes upwardly and to the front. The top portion 19 of the head may be of arcuate shape longitudinally and transversely thereof. The forward face of the blades lies in medial planes from the center of the body and the cutting edges 17 and 18 are relieved rearwardly from the face.

It will be noted in FIG. 3 that three of the blades 13 are employed in the tool illustrated in FIG. 1, with the cutting edges radially disposed relative to the center of the body. It is to be understood that any number of the blades may be employed within the body, depending upon the diameter thereof and the number of cutting edges which are desired. To permit a sufficient inward deflection of the blades, the inner portion opposite to the head 21 slopes upwardly from the secured ends, permitting all of the heads 19 of the blades to deflect within the body without interfering with each other. When permitted to deflect into the body without interference, the heads may pass through an aperture to be deburred so as to cut a burr from each side thereof.

In FIG. 4, the blades 13 are shown as having the outer portion machined to lie within the outer surface of the body after the rear ends are secured to the slot by the brazing material 22. In FIGS. 3 and 5, the body in the area of the cutting head 16 is relieved at 23 to provide chip clearance in the direction forwardly of the direction of advancement of the head. The rear end of the body is placed in a driving element which rotates the body and advances it into an aperture which is to be deburred. The burr at the edge of the aperture adjacent to the side toward which the tool is advanced will have the burr removed by the cutting edge 17. As the body is further advanced, the heads 16 deflect into the body, permitting the outer edges 19 to pass through the apertures. The blades thereafter spring outwardly to have the cutting edges 18 disposed in position to remove the burr on the inner edge of the apertures when the body is withdrawn therefrom.

Should the deburring tool as illustrated in FIG. 3 require more strength to resist the deflection of the head end 16 of the blade, in FIG. 6 a form of the invention is illustrated by which the resistance to deflection may be controlled. A second aperture 25 is provided inward of the body from the aperture 11 which may extend to the rear end thereof. The aperture 25 is provided with a thread for receiving the threaded end 26 of an Allen screw 27. The cylindrical head 28 of the screw has a hexagonal recess 29 therein for an Allen wrench by which the head may be adjusted longitudinally in the aperture 11. The head changes the length of the cantilever portion of the blades 13 and the bending moment of the head end of the blades. The screw 27 may be threaded within a short aperture 25 in extension of the aperture 11 but, as illustrated in the figure, the end of the screw 27 opposite to that having the head 28 may be provided with a screwdriver slot so that the head may be adjusted from either end of the body.

A still further form of the invention is illustrated in FIG. 7 wherein the blades 13 are secured in the slots 12 by a cylindrical band 32 instead of by the brazing operation referred to hereinabove with regard to the tools of FIGS. 1 to 6. In this arrangement, the blades are machined to desired thickness before being placed within the slots 12 and the body is recessed at 33 to receive the band. The band 32 is expanded by heat to as large a diameter as possible and the body of the tool is shrunk by cooling to as low a temperature as convenient. Thereafter, the band 32 is slid over the body into the area of the recess 33 into which it will shrink as the recess expands upon the cooling of the band and the heating of the body. The band will provide a tension to the recessed portion and to the engaged blade portions within the recess to rigidly secure the blades to the body.

In any of the arrangements herein described, a deburring tool is provided in which the cutting heads are a part of fixed blades which are resilient and deflectable. The blades are preferably made of tool steel and the body may be made from carbon steel, the outer surface of which may be carburized or otherwise skin-hardened in a manner well known in the art. When the tension on the blade is to be increased, a head is adjustable in an aperture with which the blades communicate. The head changes the length of the lever arm of the blade and therefore the force required to deflect the cutting heads thereof.

What is claimed is:

1. In a deburring tool, a cylindrical elongated body having a central aperture in the cutting end and at least one slot extending inwardly from the outer surface communicating with said aperture at the forward part thereof, a blade for said aperture having the rear end brazed in the rear portion of said slot with the front portion deflectable by bending within said aperture through the springing of the blade, and a head on the cutting end of the blade having a forward cutting edge.

2. In a deburring tool, a cylindrical elongated body having a central aperture extending inwardly from the cutting end, a plurality of longitudinally disposed slots extending inwardly from the outer surface of the body with the forward portion thereof communicating with said aperture, a blade within each said slot having the rear portion fixed against movement within the rear end of said slot within the diameter of the body in position to have the forward portion thereof deflectable by bending within said aperture through the springing of the blade, and a cutting head on the forward portion of each of said blades.

3. In a deburring tool, a cylindrical elongated body having a central aperture extending inwardly from the cutting end, a plurality of longitudinally disposed slots extending inwardly from the outer surface of the body with the forward portion thereof communicating with said aperture, a blade within each said slot having the rear portion brazed within the rear end of said slots in position to have the forward portion thereof deflectable by bending within said aperture, and a cutting head on the forward portion of each of said blades, the forward face of the blades in the direction of rotation being disposed on radial planes from the center of the body.

4. In a deburring tool, a cylindrical elongated body having a central aperture in the cutting end and at least one slot extending inwardly from the outer surface communicating with said aperture at the forward part thereof, a blade for said aperture, brazing material securing the rear portion of the blade in said slot with the front portion deflectable by bending within said aperture, and a head on the cutting end of the blade having a forward cutting edge which slopes from the bottom rearwardly toward the top, the rear portion of said head also containing a cutting edge which slopes forwardly from the body toward the top of the head.

5. In a deburring tool, a cylindrical elongated body having a central aperture in the cutting end and at least one slot extending inwardly from the outer surface communicating with said aperture at the forward part thereof, a blade for said aperture, brazing material securing the rear portion of the blade in said slot with the front portion deflectable by bending within said aperture, and a head on the cutting end of the blade having a forward cutting edge which slopes from the bottom rearwardly toward the top, the rear portion of said head also containing a cutting edge which slopes forwardly from the body toward the top of the head, said head having a top portion of arcuate form longitudinally and laterally thereof.

6. In a deburring tool, a cylindrical elongated body having a central aperture in the cutting end and at least one slot extending inwardly from the outer surface communicating with said aperture at the forward part thereof, a blade of spring material for said aperture having the rear end secured in the rear portion of said slot with the front portion deflectable by bending within said aperture, a cutting head on the forward end of the blade, and fulcrum means adjustable within said aperture for changing the bending point of the blade and the cutting pressure of the cutting head.

7. In a deburring tool, a cylindrical elongated body having a central aperture in the cutting end and at least one slot extending inwardly from the outer surface communicating with said aperture at the forward part thereof, a blade for said aperture brazing material securing the rear portion of the blade in said slot with the front portion deflectable by bending within said aperture, a head on the cutting end of the blade having a forward cutting edge, and an element within said aperture adjustable therealong to form a fulcrum forwardly of the secured end of the blade to change the point at which the bending of said blade occurs to regulate the cutting pressure.

8. In a deburring tool, a cylindrical elongated body having a central aperture in the cutting end and at least one slot extending inwardly from the outer surface communicating with said aperture at the forward part thereof, a blade for said aperture having the rear end fixed against movement in the rear portion of said slot with the front portion deflectable by bending within said aperture, a head on the cutting end of the blade having a forward cutting edge, an element within said aperture adjustable therealong to form a fulcrum forwardly of the secured end of the blade to change the point at which the bending of the blade occurs to regulate the cutting pressure, and means at either end of the body for adjusting the element longitudinally in said aperture.

9. In a deburring tool, a cylindrical elongated body having a central aperture extending inwardly from the cutting end, a plurality of longitudinally disposed slots extending inwardly from the outer surface of the body with the forward portion thereof communicating with said aperture, a blade within each said slot having the rear portion fixed against movement within the rear end of said slot in position to have the forward portion thereof deflectable by bending within said aperture, a cutting head on the forward portion of each of said blades, said aperture having a threaded aperture in extension thereof, and a headed screw threaded into said threaded aperture with the head disposed in said first aperture and containing means by which the screw is rotated to adjust the head along the aperture to change the point at which the bending of the blade occurs.

10. In a deburring tool, a cylindrical elongated body having a central aperture extending inwardly from the cutting end, a plurality of longitudinally disposed slots extending inwardly from the outer surface of the body with the forward portion thereof communicating with said aperture, a blade within each said slot having the rear portion secured within the rear end of said slot in position to have the forward portion thereof deflectable by bending within said aperture, a cutting head on the forward portion of each of said blades, said aperture having a threaded aperture in extension thereof which communicates with the opposite end of the body, and a headed screw within the threaded aperture having a screw slot on the end thereof adjacent to the opposite end of the body by which the head is adjusted in the slot.

11. In a deburring tool, a cylindrical elongated body having a central aperture extending inwardly from the cutting end, a plurality of longitudinally disposed slots extending inwardly from the outer surface of the body with the forward portion thereof communicating with said aperture, a blade within each said slot having the rear portion secured within the rear end of said slot in position to have the forward portion thereof deflectable by bending within said aperture, a cutting head on the forward portion of each of said blades, said aperture having a threaded aperture in extension thereof which communicates with the opposite end of the body, and a headed screw within the threaded aperture having a screw slot on the end thereof adjacent to the opposite end of the body by which the head is adjusted in the slot, said screw head having a tool receiving aperture therein by which it may be rotated to be adjusted within said slot from the cutting end of the body.

References Cited in the file of this patent
UNITED STATES PATENTS

| | | |
|---|---|---|
| 1,127,121 | Wahlstrom | Feb. 2, 1915 |
| 2,620,689 | Cogsdill | Dec. 9, 1952 |
| 2,657,597 | Pickering et al. | Nov. 3, 1953 |
| 2,693,725 | Cummins | Nov. 9, 1954 |
| 2,819,629 | Robinson | Jan. 14, 1958 |
| 2,855,812 | Fried | Oct. 14, 1958 |